(No Model.) 2 Sheets—Sheet 2.
C. W. CHENEY.
LAWN MOWER.
No. 300,345. Patented June 17, 1884.
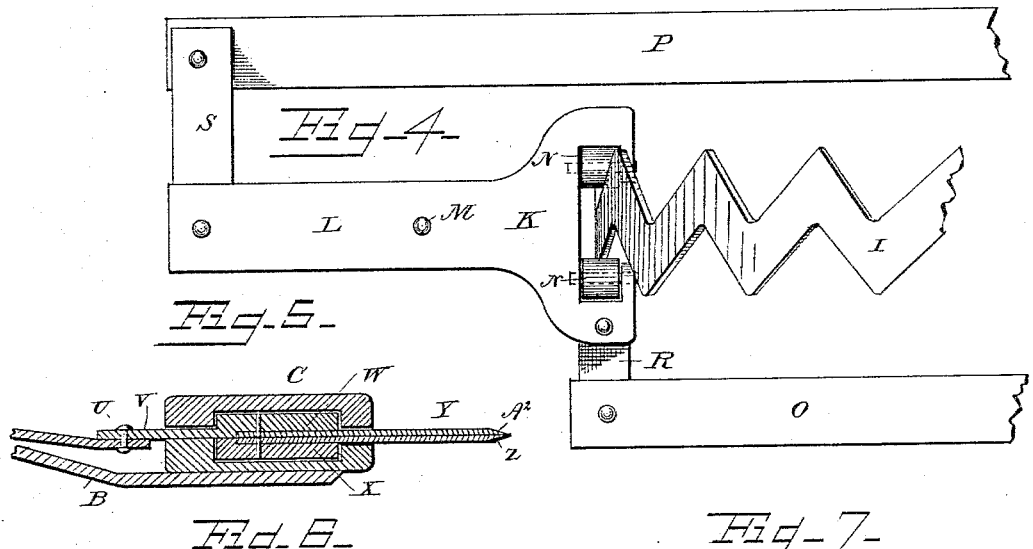
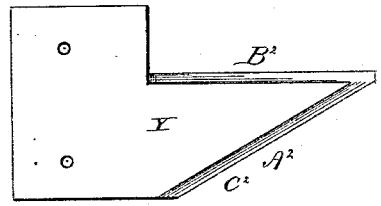
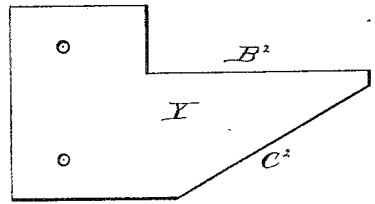
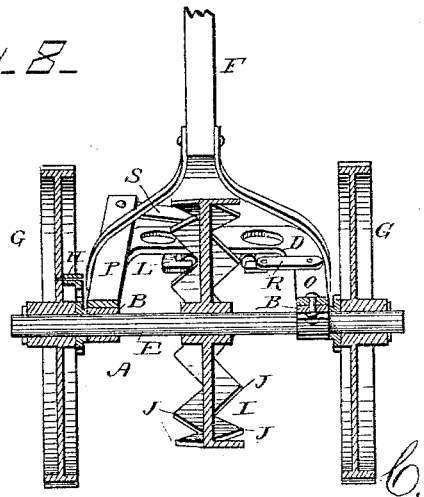
WITNESSES
F. L. Ourand
E. G. Siggers
C. Warren Cheney,
INVENTOR
by C. A. Snow & Co
Attorneys

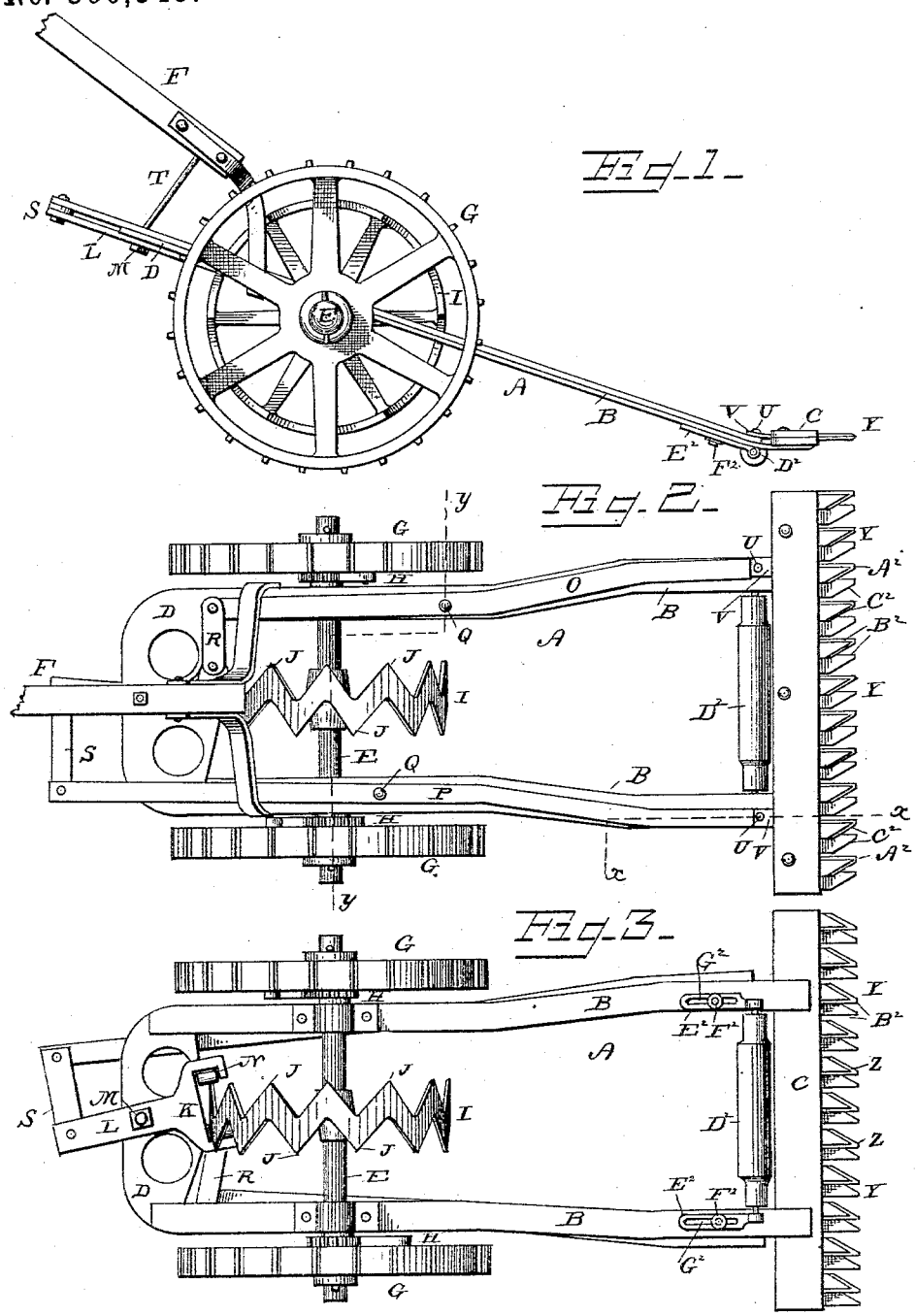

UNITED STATES PATENT OFFICE.

CHARLES WARREN CHENEY, OF ATHOL, MASSACHUSETTS.

LAWN-MOWER.

SPECIFICATION forming part of Letters Patent No. 300,345, dated June 17, 1884.

Application filed November 6, 1883. (No model.)

*To all whom it may concern:*

Be it known that I, C. WARREN CHENEY, a citizen of the United States, residing at Athol, in the county of Worcester and State of Massachusetts, have invented a new and useful Lawn-Mower, of which the following is a specification, reference being had to the accompanying drawings.

This invention relates to lawn-mowers; and its object is to provide a machine that will readily cut any height of grass, that will not become clogged, and which will possess superior advantages in point of simplicity, inexpensiveness, durability, and general efficiency.

In the drawings, Figure 1 is a side view of my improved mower. Fig. 2 is a top view of the same. Fig. 3 is a bottom view thereof. Fig. 4 is a detail plan view of the vibrating lever, its connections with the knife-operating levers, and its operating-cam. Fig. 5 is a detail sectional view through the cutter-bar on the line $x\ x$, Fig. 2. Fig. 6 is a detail plan view of one of the knives or cutters of the top series. Fig. 7 is a detail plan view of one of the knives of the bottom series. Fig. 8 is a transverse vertical sectional view of the mower on the line $y\ y$, Fig. 2.

Referring to the drawings, A designates the frame of the machine, which comprises longitudinal inclined side bars, B B, carrying the transverse cutter-supporting bar C at their lower front ends, and connected by a cross-piece, D, at their rear top ends, the said frame being mounted upon a transverse rotary axle or shaft, E, near its rear end, and provided with a rearwardly-projecting operating-handle, F, that is secured to the side pieces, B B. The shaft E carries the drive-wheels G G, the connection between the same being preferably by means of the usual pawl-and-ratchet mechanism, H, so that the shaft will only be locked with the wheels and turn during the forward movement of the machine, and will remain stationary during rearward movement of the wheels.

Secured to the shaft E is a cam-plate or wave-wheel, I, having lateral cam projections J J at each side of its periphery, which alternately engage each side of the front bifurcated end, K, of a vibrating lever, L, that is pivoted to the under side of the cross-piece D, as shown at M, the end K being preferably provided with friction-rollers N N, against which the cam projections J J bear. By this means a vibrating or oscillating motion is imparted to the lever L as the shaft E revolves, and this motion is transmitted to the longitudinal levers O and P, that are fulcrumed on the side pieces, B B, as shown at Q, and are connected, respectively, to the front and rear ends of lever L by pivoted links R and S. The pivot M of the lever L is preferably extended upward, as shown at T, to form a brace for the handle F. The lower front ends of the levers O and P are pivotally connected, as shown at U, to rearward extensions or arms V V, respectively, upon the top cutter-bar, W, and the corresponding bottom cutter-bar, X, which bars are thereby reciprocated in opposite directions in the cutter-supporting bar C.

Y designates the knives or cutters, which, in lieu of being V-shaped, have one of their edges about at a right angle to the cutter-bar, by which straight line the grass will be invariably cut. The knives of the bottom series have their cutting-edges beveled on their under side, as shown at Z, while the knives of the top series have their edges beveled on their top side, as shown at $A^2$, and the knives of both series have their straight edges $B^2$ all at the same side, whereby, as the series move in opposite directions, the slanting edges $C^2$ of one series cut with the straight edges of the other series. The play of the levers O and P is preferably sufficient to cause the edges of the knives of one series to cross the edges of two knives of the other series at each stroke, thus performing two cuts at each stroke, and, besides, serving to keep the knives clean and free from clogging.

From the foregoing description the operation and advantages of my invention will be readily understood. The cutter-bar C is held above the ground by a roller, $D^2$, that has bearings on the sides B B, just in rear of the cutter-bars. The bearing-plates $E^2\ E^2$ of the roller $D^2$ are adjustable longitudinally in relation to the bars B B by means of set-screws $F^2$, working through slots $G^2$ in the plates $E^2$. By thus adjusting the position of the roller, the height of the cutter-bar above the ground can be readily regulated, as the frame A will turn on the bearings of the axle or shaft E.

I claim as my invention—

1. The combination of the frame of the machine, the rotary axle carrying the drive-wheels, a cutter-supporting bar secured across the front of the frame, a cam-wheel secured about centrally on the axle, a horizontally-oscillating lever fulcrumed on the frame just in rear of the cam-wheel, longitudinal oscillating levers fulcrumed at the sides of the frame, pivoted links connecting these longitudinal levers with the main oscillating lever respectively in front and in rear of its fulcrum, and the transverse cutter-bars pivotally connected with the ends of the longitudinal levers, substantially as set forth.

2. The combination of the inclined frame of the machine, the cutter-supporting bar secured to the lower front end thereof, the supporting-roller journaled just back of said bar, the rotary axle having the cam-wheel, a lever fulcrumed on the frame in rear of the axle and oscillated by the cam, the longitudinal side levers pivoted on the frame at its sides, the links connecting said levers with different ends of the oscillating levers, and the oppositely-moving cutter-bars arranged one above the other, and pivotally connected to the lower ends of the longitudinal levers, substantially as set forth.

3. In a lawn-mower, the combination of the independent series of knives or cutters disposed one series directly above the other and reciprocating in opposite directions, the teeth being formed with one straight edge at about a right angle to the cutter-bar, substantially as and for the purpose set forth.

In testimony that I claim the foregoing as my own I have hereto affixed my signature in presence of two witnesses.

CHARLES WARREN CHENEY.

Witnesses:
  GEO. M. GERRY,
  HENRY M. BURLEIGH.